(12) United States Patent
Fischer et al.

(10) Patent No.: US 6,606,892 B2
(45) Date of Patent: Aug. 19, 2003

(54) APPARATUS FOR AUTOMATED PEENING OF TENONS CONNECTING TURBINE BUCKETS AND COVER PLATES

(75) Inventors: Todd Joseph Fischer, Ballston Spa, NY (US); Jeffrey Philip Fregoe, Churchville, NY (US); David Ward Marcellus, Jr., Webster, NY (US); Dennis W. Roberts, Schenectady, NY (US); John Francis VanNest, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/193,254

(22) Filed: Jul. 12, 2002

(65) Prior Publication Data

US 2002/0174526 A1 Nov. 28, 2002

Related U.S. Application Data

(62) Division of application No. 09/849,438, filed on May 7, 2001, now Pat. No. 6,526,657.
(51) Int. Cl.⁷ .................................................. B21J 1/00
(52) U.S. Cl. ........................ 72/53; 29/90.7; 29/23.51; 29/889.21; 29/889.22
(58) Field of Search ................................ 72/53; 29/90.7, 29/889.2, 889.21, 889.22, 505, 521, 522.1, 523, 23.51

(56) References Cited

U.S. PATENT DOCUMENTS

| | | | |
|---|---|---|---|
| 3,619,079 A | 11/1971 | Torstenfelt | |
| 4,426,867 A | * 1/1984 | Neal et al. | 72/53 |
| 4,437,213 A | 3/1984 | Reese et al. | |
| 4,762,261 A | 8/1988 | Hawly et al. | |
| 5,060,375 A | 10/1991 | Demichel | |
| 5,146,679 A | 9/1992 | Ortolano | |
| 5,238,368 A | 8/1993 | Ortolano | |
| 5,275,052 A | 1/1994 | Luttrell et al. | |
| 6,336,844 B1 | 1/2002 | Duquenne et al. | |
| 6,505,489 B2 | * 1/2003 | Berthelet et al. | 72/53 |
| 6,514,039 B1 | * 2/2003 | Hand | 415/119 |
| 2002/0056303 A1 | * 5/2002 | Berthelet et al. | 72/53 |
| 2002/0069687 A1 | * 6/2002 | Berthelet et al. | 72/53 |
| 2002/0081204 A1 | 6/2002 | Burnett et al. | |

* cited by examiner

*Primary Examiner*—Irene Cuda-Rosenbaum
(74) *Attorney, Agent, or Firm*—Nixon & Vanderhye

(57) ABSTRACT

An automatic machine for peening the tenons on bucket cover plates to secure the cover plates and adjacent buckets of a turbine wheel to one another is provided. The machine includes a fixture having stepped surfaces for locating the freely suspended fixture and peening tool relative to the bucket tips and cover plates and clamping the tips and cover plates to the fixture surfaces. After peening a first tenon, the fixture and tool head are displaced relative to the fixed cover plate and bucket tip to register the tool with a second tenon. An actuator displaces the suspended system to compensate for the movement of the fixture and tool relative to the turbine wheel. A counterbalance is provided to accommodate fixtures of different weights when peening the tenons of covers in different turbine wheels.

19 Claims, 9 Drawing Sheets

APPARATUS FOR AUTOMATED PEENING OF TENONS CONNECTING TURBINE BUCKETS AND COVER PLATES

This application is a division of application Ser. No. 09/849,438, filed May 7, 2001, the entire content of which is hereby incorporated by reference in this application, now U.S. Pat. No. 6,526,657.

BACKGROUND OF THE INVENTION

The present invention relates to an automated peening tool for automatically peening the tenons of cover plates to secure the cover plates and adjacent tips of turbine buckets to one another and to methods for peening the tenons for connecting the cover plates and buckets to one another.

In the construction of turbines, for example, steam turbines, cover plates are employed for a variety of reasons and are generally secured to the tips of the turbine buckets by peening tenons formed on the buckets or the cover plates. While radial peening is oftentimes used in certain bucket constructions, axial entry-type buckets are typically continuously coupled to one another by cover plates located between sides or side faces of adjacent bucket tips. The cover plates and bucket tips are conventionally alternately exposed about the periphery of the turbine wheel. Each cover plate typically has a pair of tenons projecting from opposite sides and extending through pairs of openings in the respective tips of adjacent buckets. Thus, a cover plate is secured to one bucket along one side of the cover plate and to another adjacent bucket along the opposite side of the cover plate with the pairs of tenons engaging through openings in the respective bucket tips. That is, each bucket tip has four openings and receives a pair of tenons of a cover plate on one side of the bucket tip through two of the openings and another pair of tenons of another cover plate on an opposite side of the bucket tip through the remaining two openings. It will be appreciated that there are other bucket/tip/cover plate securements having only one tenon for securing each bucket.

To secure the bucket tips and cover plates to one another, solid tenons on the admission sides of the cover plates are peened into the bucket tip openings in order to fill the entire chamfer machined about the bucket tip openings. Filling this chamfer pulls the bucket tight to the cover plate, enabling the cover plate and bucket to act as one integral assembly. The opposite side of each cover plate has a pair of hollow tenons which are flared about the openings of an adjacent bucket tip sufficiently to enable a calculated growth and untwist of the buckets when the turbine is at speed.

Conventionally, the tenons are peened into the bucket chamfers using a reciprocating riveting tool. The riveting tool is conventionally held in the operator's hand and the tool anvil is placed on the tenon exposed through the tip of the bucket. A large backing plate is manually held against the discharge side of the buckets, the bucket is pried tight to the cover and the tenon is peened until the chamfer is filled. This manual method of peening the tenons to secure the buckets and cover plates to one another is abusive on the riveting tool and the operator holding the backing plate in place. Further, not only is the riveting operation loud but there is substantial variation from tenon to tenon based on operator action. These prior manual peening methods also could not properly fill the chamfer. While certain automated riveting tools, including reciprocating, orbital and radial forming tools are available, none, to applicants' knowledge, automatically peen a tenon as well as a tenon peened by a manual operation. Accordingly, it is desirable to provide an automated machine and methods for peening tenons for securing cover plates and adjacent bucket tips of a turbine wheel to one another.

BRIEF SUMMARY OF THE INVENTION

In accordance with a preferred embodiment of the present invention, there is provided an automated tenon peening tool and methods of peening tenons to secure cover plates and adjacent bucket tips of a turbine wheel to one another and which is particularly useful on axial entry-type continuously coupled turbine buckets. As noted above, cover plates between the tips of adjacent buckets have a pair of tenons projecting from opposite sides thereof. One pair of tenons is solid and intended for peening to substantially integrally secure the cover plate to a bucket. Another pair of tenons projecting from the opposite side of the cover plate are hollow and are flared subsequent to the automated peening operation to permit calculated growth and untwist of the bucket vanes relative to one another during operation. it will be appreciated, however, that instead of a pair of tenons securing a bucket tip and cover plate to one another, the peening apparatus and method hereof may be used to join the bucket tip and cover plate with only one solid tenon on one side and a hollow tenon on the opposite side. It is an automated peening apparatus and method of operation for securing cover plates and bucket tips to one another which is the subject of this invention.

The automated peening apparatus includes a fixture having stepped surfaces for locating preassembled, unsecured bucket tips and cover plates therebetween in registration with the fixture surfaces. In a preferred embodiment, a pair of tenons project from a cover plate through openings in a bucket tip for engagement in recesses in a locator surface of the fixture to locate a pair of bucket tips and a cover plate therebetween relative to the locator surface. The remaining stepped surfaces (two) of the fixture straddle the locator surface, and have a pair of recesses, and each receives tenons projecting from adjacent cover plates to support the preassembled bucket tips and cover plates in the fixture. Clamps, movable between open and closed positions, are movable to clamp the bucket tips and cover plates against the surfaces. With this arrangement, an opposing pair of solid tenons project from the opposite side of the cover plate through openings in an adjacent bucket tip.

Further, the fixture and peening head are carried on a first C-frame for receiving the bucket tips and cover plates between the peening tool carried by the head and fixture surfaces. The first C-frame is, in turn, releasably rotatably supported by a second C-frame suspended through an actuator from a point support whereby the peening apparatus is freely suspended and floating relative to the point support and bucket wheel undergoing fabrication. A hydraulic cylinder is carried by one leg of the first C-frame for displacing the first C-frame and peening head carried thereby relative to the bucket wheel clamped to the fixture. The actuator between the point support and the peening apparatus displaces the apparatus between raised and lowered positions to accommodate the movement of the peening head and support structure relative to the fixed bucket wheel and fixture when the peening tool is displaced for peening the second tenon after the first tenon has been peened. For example, as the peening head is raised by actuation of the hydraulic cylinder to align the peening tool with the second tenon, the actuator cylinder takes up the stack in the hook/chain caused thereby.

Where differently configured bucket wheels and buckets are employed, a different fixture is employed in a similar manner to accommodate the different sized bucket wheels. To compensate for the difference in weight of the various fixtures, the actuator and support assembly are linearly displaceable relative to one another in a horizontal direction, thereby counterbalancing the weight.

To utilize the automated peening apparatus, the cover plates and bucket tips are preassembled in unsecured relation to one another. With the bucket wheel fixed, a surface of the fixture is brought into alignment with a selected cover plate and bucket tip to enable the tenons on one side of the selected cover plate to extend through the bucket tip and engage in the locator recesses in the locator surface on the fixture. This is accomplished by manual displacement of the apparatus relative to the fixed bucket wheel. The clamps are then actuated to clamp the selected bucket tip and a pair of bucket tips straddling the selected bucket tip with the cover plates therebetween to the fixture surfaces. With the peening tool in alignment with one of the two solid tenons to be peened, the tool using a radial motion peens the tenon. Upon withdrawal of the tool, the first C-frame mounting the peening head is indexed to locate the tool head in alignment with the second tenon, while the bucket wheel and fixture remain stationary and clamped to one another. During movement of the suspended peening apparatus, the actuator displaces the peening apparatus a corresponding distance. The peening tool is then aligned with the second tenon and the second tenon is peened. The bucket wheel is then indexed and the operation is repeated until all of the solid tenons on one side of the bucket wheel have been peened. The peening apparatus is then removed and the tenons on the opposite side of the bucket wheel are flared, using other apparatus, to complete the securement of the cover plates and bucket tips to one another.

In a preferred embodiment according to the present invention, there is provided apparatus for securing a cover plate and tips of adjacent buckets of a turbine wheel to one another wherein the cover plate has a tenon projecting from each of the opposite sides thereof and through an opening formed in the respective tips of adjacent first and second buckets, comprising a fixture having a plurality of discrete surfaces for registration with side faces of the bucket tips, at least one of the surfaces having a recess for receiving an end portion of a tenon projecting from one side of a cover plate and through an opening in the tip of the first bucket for locating the cover plate and first bucket tip relative to the fixture and a peening head having a tool spaced from one fixture surface for peening an end of a tenon projecting from an opposite side of the cover plate and through an opening in the tip of a second bucket adjacent to and lying on the opposite side of the cover plate from the first bucket tip.

In a further preferred embodiment according to the present invention, there is provided apparatus for securing a cover plate and tips of adjacent buckets of a turbine wheel to one another wherein the cover plate has a tenon projecting from each of the opposite sides thereof and through an opening formed in the respective tips of adjacent first and second buckets, comprising a fixture having a plurality of discrete, generally parallel, surfaces offset from one another for registration with side faces of the adjacent first and second bucket tips and locating the cover plate and the first and second bucket tips relative to the fixture, a peening head having a tool spaced from the fixture for peening an end of a tenon projecting from an opposite side of the over plate and through an opening in the tip of a second bucket adjacent to and lying on the opposite side of the cover plate from the first bucket tip.

In a further preferred embodiment according to the present invention, there is provided in an apparatus including a fixture having a surface for registration with a side face of a first bucket tip of a first bucket and a guide for locating the first bucket tip and surface relative to one another, the surface lying in opposition to a peening tool for peening end portions of a tenon projecting from one side of a cover plate through an opening in a second tip of a second bucket adjacent the first bucket wherein the cover plate lies between first and second tips of the first and second buckets, respectively, a method of securing the cover plate between the first and second buckets, comprising (a) locating the tip of the first bucket in opposition to the fixture surface utilizing the guide to locate the fixture surface and the tip of the first bucket and the cover plate relative to one another and (b) peening a tip portion of the tenon projecting from the one side of the cover plate through the opening in the second tip of the second bucket by engaging the peening tool and the tenon tip to secure the cover plate and the second bucket to one another.

DETAILED DESCRIPTION OF THE INVENTION

Figure 1:
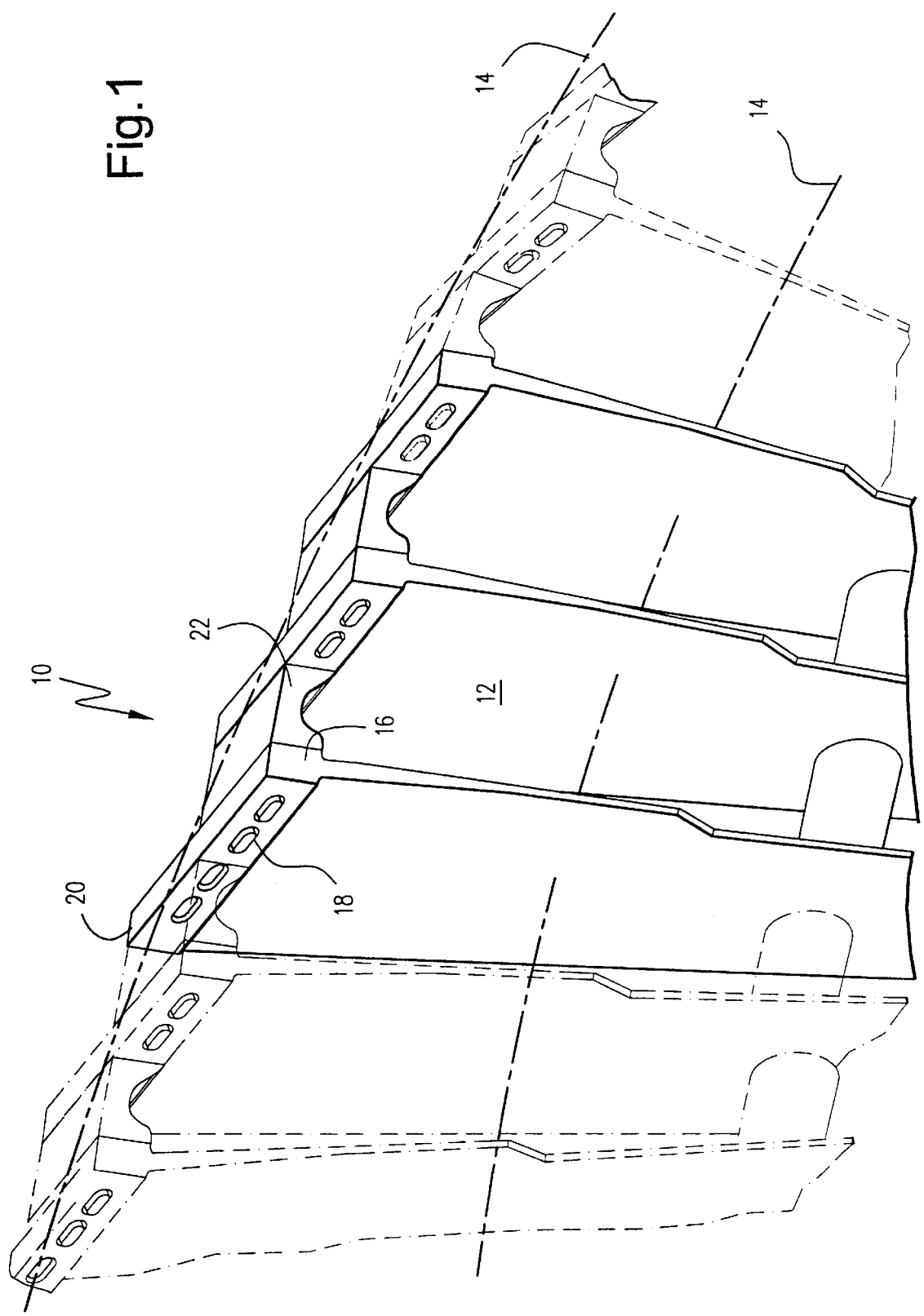
FIG. 1 is a fragmentary perspective view of a portion of a turbine wheel illustrating certain of the buckets and the cover plates between adjacent bucket tips.
Figure 2:
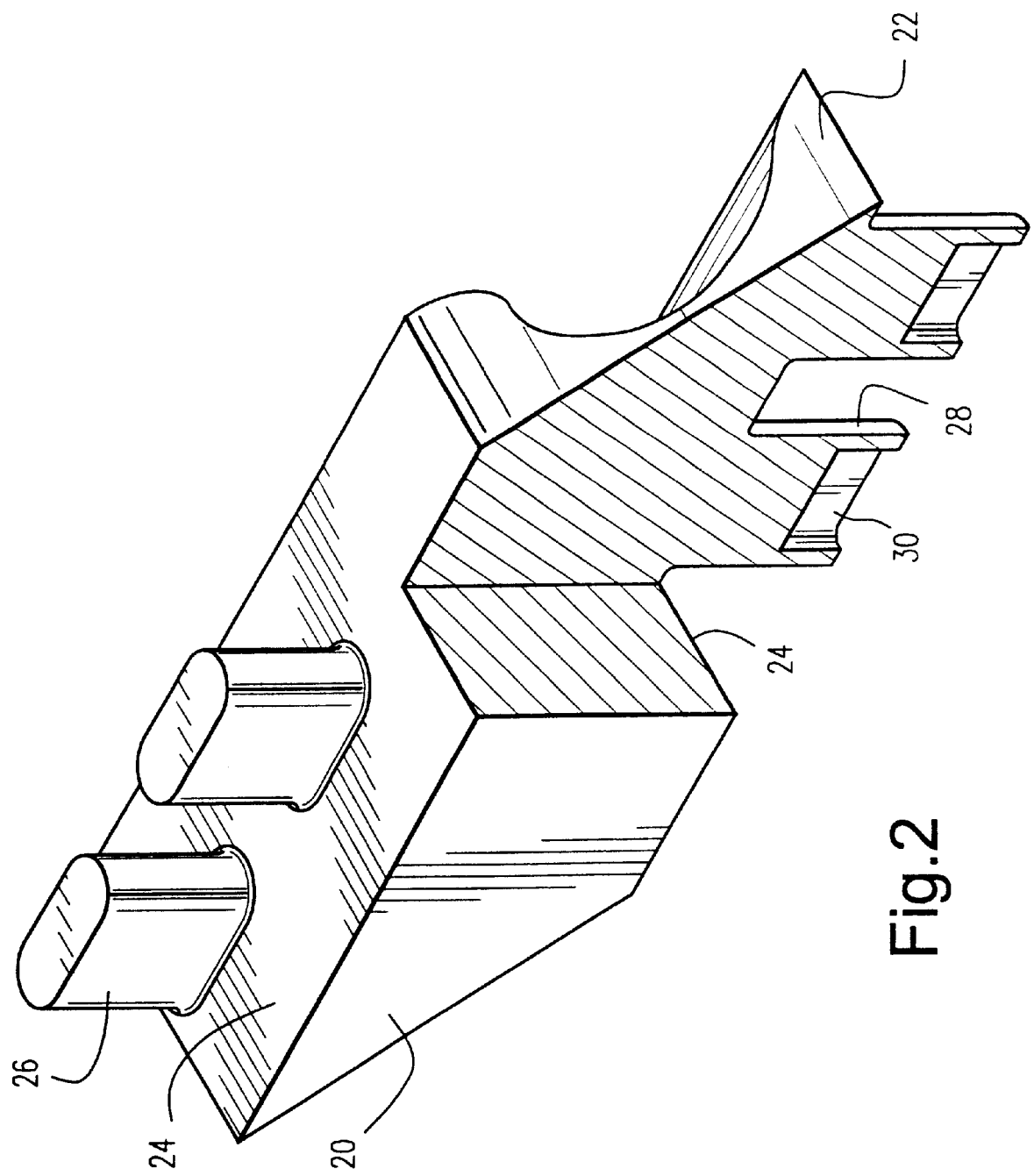
FIG. 2 is an enlarged perspective view with portions broken out and in cross-section of a cover plate.

Referring now to the drawings, particularly to FIGS. 1 and 2, there is illustrated a turbine wheel, generally designated 10, including a plurality of buckets 12 arranged on the wheel for rotation about an axis, not shown. The plane of the turbine wheel normal to the axis of rotation is illustrated by the dashed line 14 in FIG. 1. It will be seen in FIG. 1 that the blades are twisted relative to the plane 14 containing the buckets. Each of the buckets 12 terminates in a tip 16 which is enlarged relative to the side faces of the buckets 12 and has a plurality of openings 18 therethrough. In a preferred and illustrated form of the present invention, there are four openings 18 in each of the tips 16 of each bucket 12. Disposed between the bucket tips are cover plates 20. The cover plates 20 have angled end surfaces 22 and generally parallel side surfaces 24 (FIG. 2). Along each of the parallel side surfaces 24 is a pair of tenons which project outwardly generally in a direction normal to the side surfaces 24. The tenons 26 on one side of each cover plate 20 are solid, while the tenons 28 on the opposite side have central openings 30, enabling the tenons 28 to be flared into chamfered holes 18 on the bucket tips 16 after the peening of tenons 26 about the entire periphery of the bucket wheel is completed. The present invention is also applicable to bucket tips and cover plates having a single tenon on each of the opposite sides of the cover plate for securing the cover plate to adjacent tenons.

It will be appreciated from the foregoing that the buckets and cover plates are preassembled prior to the peening operation, with the solid pairs of tenons 26 extending through pairs of openings 18 on the admissions side of the buckets, while the pairs of hollow tenons 28 are received in openings in the tips of adjacent buckets 12 on the opposite side of the wheel. Thus, the peening apparatus peens the tenons 26 to secure the cover plates and buckets to one another along the admissions side of the bucket wheel while, subsequent to the peening operation, the tenons 28 are flared independently of the peening operation for tenons 26 to secure the cover plates to the adjacent buckets along the opposite side of the bucket wheel. The latter securement enables the buckets for growth and untwist at running speed. It will also be appreciated that the preassembled turbine wheel with cover plates extending between the bucket tips will typically lie in a vertical plane in situ within the steam turbine such that the peening apparatus may be brought to the turbine wheel and the turbine wheel indexed to preferably sequentially register the bucket tips and cover plates with a peening tool and a fixture serving as an anvil, as described below.

Figure 3:
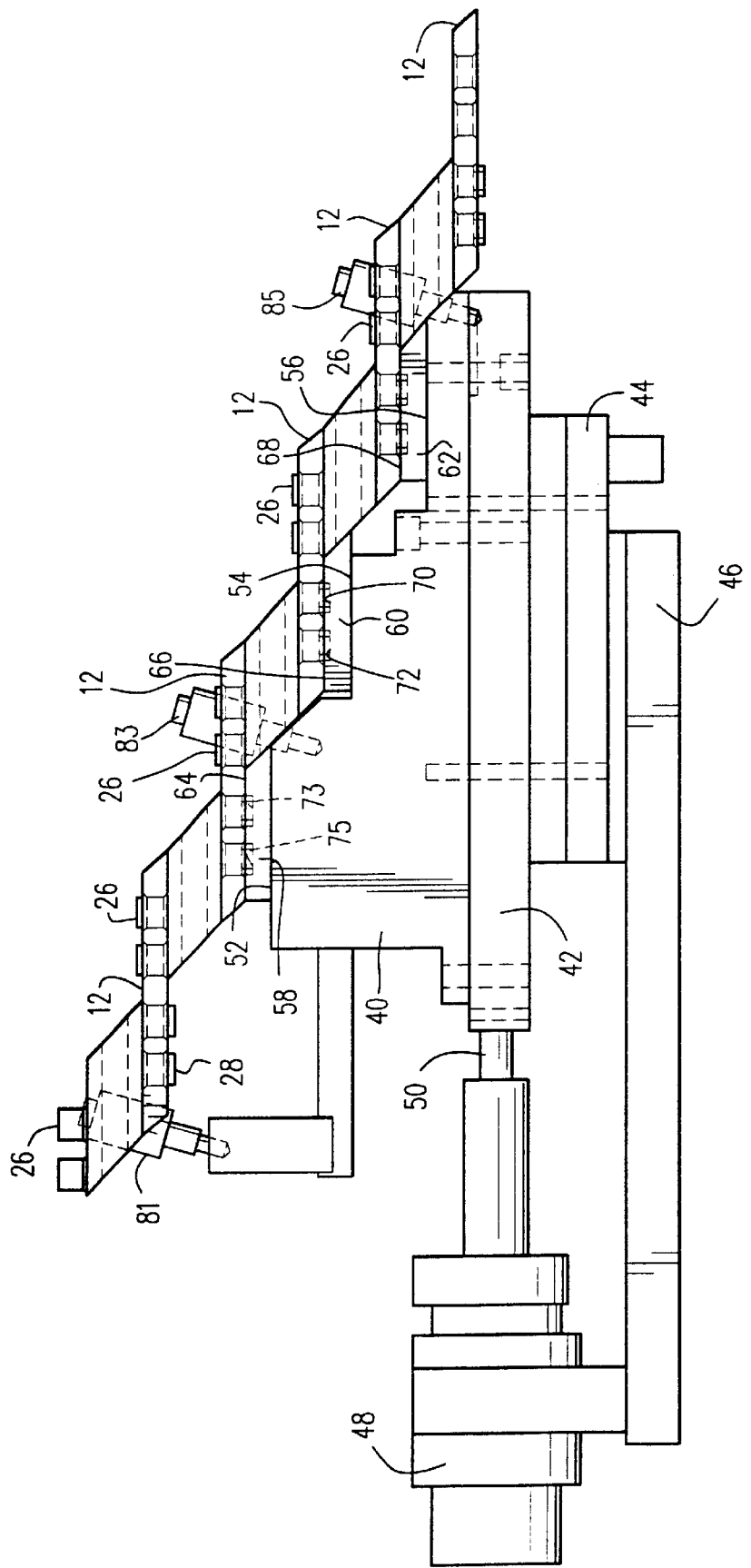
FIG. 3 is a side elevational view of a fixture for registration with the blade tips during the peening operation.

Referring now to FIG. 3, there is illustrated a fixture 40 mounted on a slide plate 42, in turn mounted on a series of guides 44 enabling plate 42 for linear sliding movement relative to a base 46. A hydraulic cylinder 48 is carried by the base 46 and has a piston head 50 connected to the plate 42 for moving the fixture and base 46 relative to one another as described below. Fixture 40 may be provided in different sizes to accommodate differently sized buckets and cover plates.

The fixture 40 includes a plurality of stepped surfaces 52, 54 and 56, on which are disposed insert plates 58, 60 and 62, respectively. The plates 58, 60 and 62 are suitably secured to the fixture 40, e.g., by pins, and have stepped surfaces 64, 66 and 68, respectively, for engagement and registration with side faces of the tips 16 of adjacent buckets 12. The insert plates 58, 60 and 62 may be provided in differently sized sets to accommodate differently sized buckets and cover plates. A guide is provided for locating the bucket tips, cover plates and fixture relative to one another. In a preferred embodiment, the guide includes the stepped surfaces. The guide may also include a pair of recesses, for example, recesses 70 and 72, in the central or locator insert 60. Recesses 70 and 72 are dimensioned to receive the tip portions of a pair of unflared tenons 28 extending from a side of a selected cover plate and through a pair of openings 18 of a bucket tip to locate the blade and the cover plate relative to the surface of insert 60. The cover plate selected constitutes the cover plate whose solid tenons 26 will be peened by the peening tool. The recess 72 is dimensioned slightly larger than the tip portion of the tenon 28 to enable the fit-up between the insert plates, bucket tips and cover plates. The insert plates 58 and 62 form support plates having enlarged recesses 73 and 75 for receiving the unflared tip portions of a pair of unflared tenons of the cover plates straddling the selected cover plate. The enlarged recesses 73 and 75 further accommodate the fit-up between the bucket tips, insert plates and cover plates.

Figure 6:
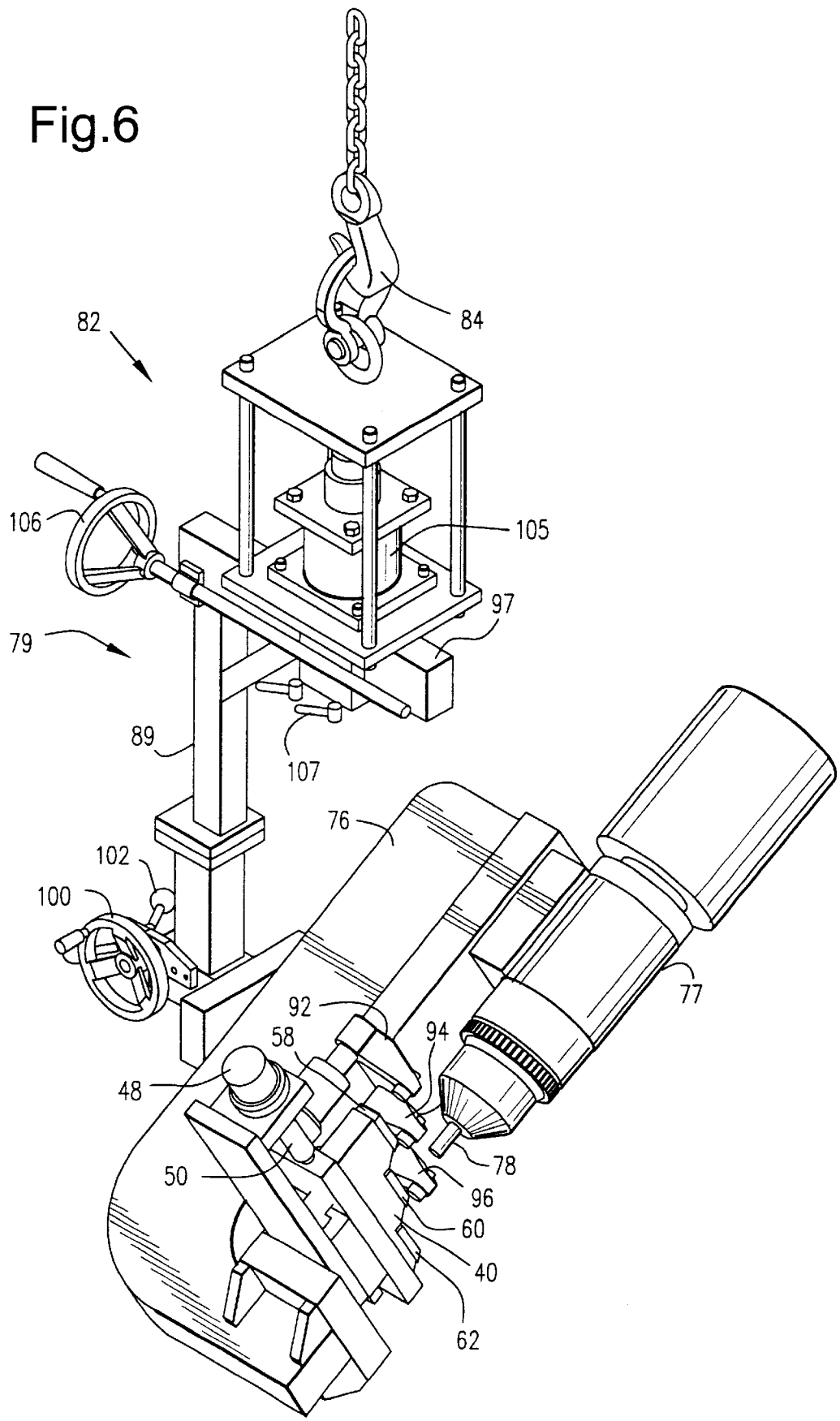
FIG. 6 is a view similar to FIG. 5 taken from a different angle.
Figure 7:
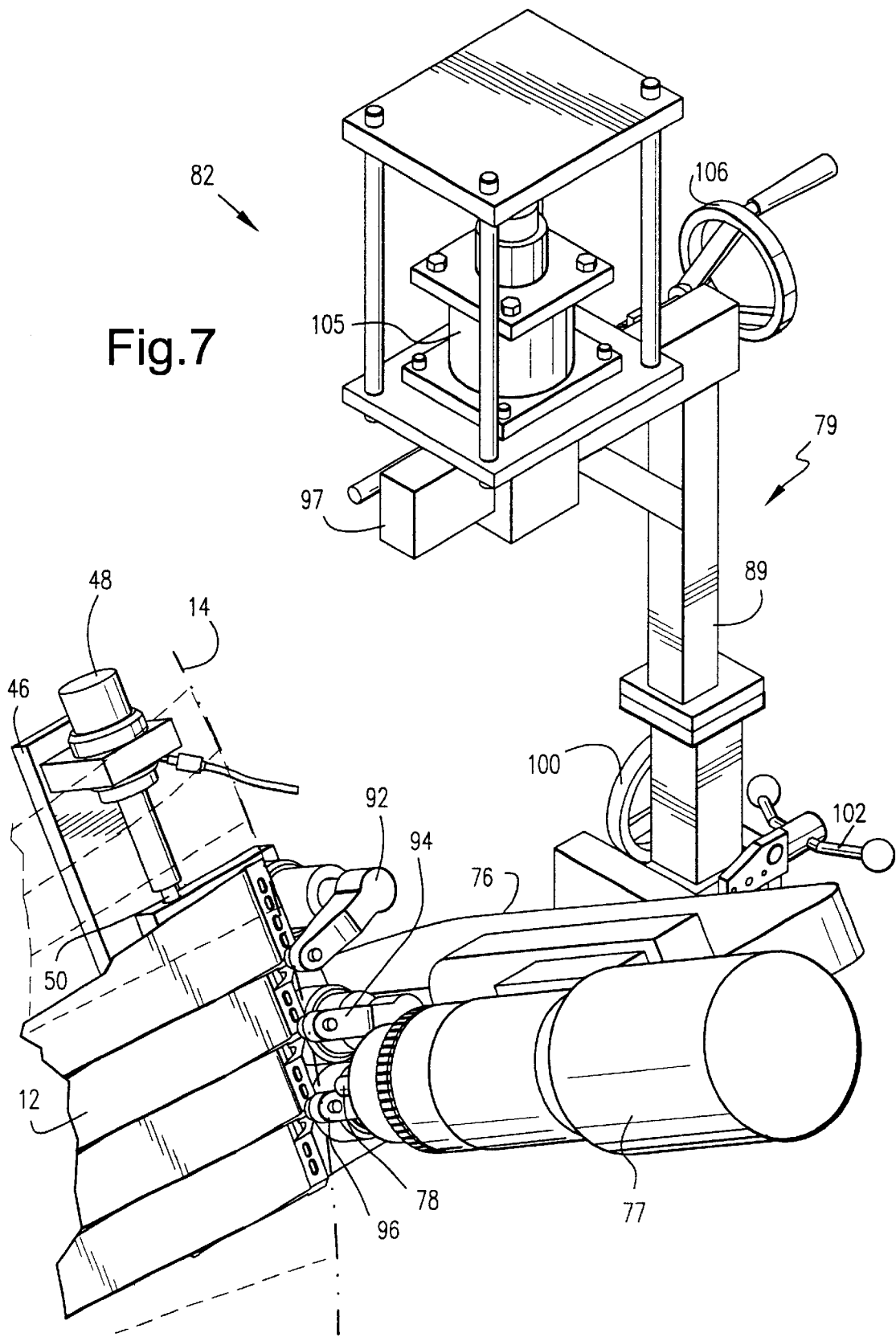
FIG. 7 is a view similar to FIG. 5 illustrating certain bucket tips and a cover plate of the turbine wheel in position for a peening operation.

The fixture 40 forms a portion of an anvil for the peening apparatus and is carried on the end of a C-shaped frame 76 which, in turn, carries the peening head 77 carrying a peening tool head 78. It will therefore be appreciated that the preassembled rotor wheel with bucket tips and cover plates in place is disposed between the fixture 40 and the peening tool 78 during the peening operation. The first mentioned C-shaped frame 76 is carried adjacent one end of the lower leg of an additional, i.e., a second C-shaped frame 79, both forming part of an assembly, generally designated 80, suspended from an actuator, generally designated 82. Actuator 82 is dependent from an overhead structure, not shown, and includes an actuator cylinder 105. Actuator 82 is coupled, for example, to a chain-and-hook arrangement 84 (FIG. 6). In this manner, the entire peening apparatus is freely suspended by the chain/hook. It will be appreciated that the turbine wheel is therefore engaged by a peening apparatus suspended from a single point, i.e., the peening apparatus comprises a floating structure.

Figure 4:
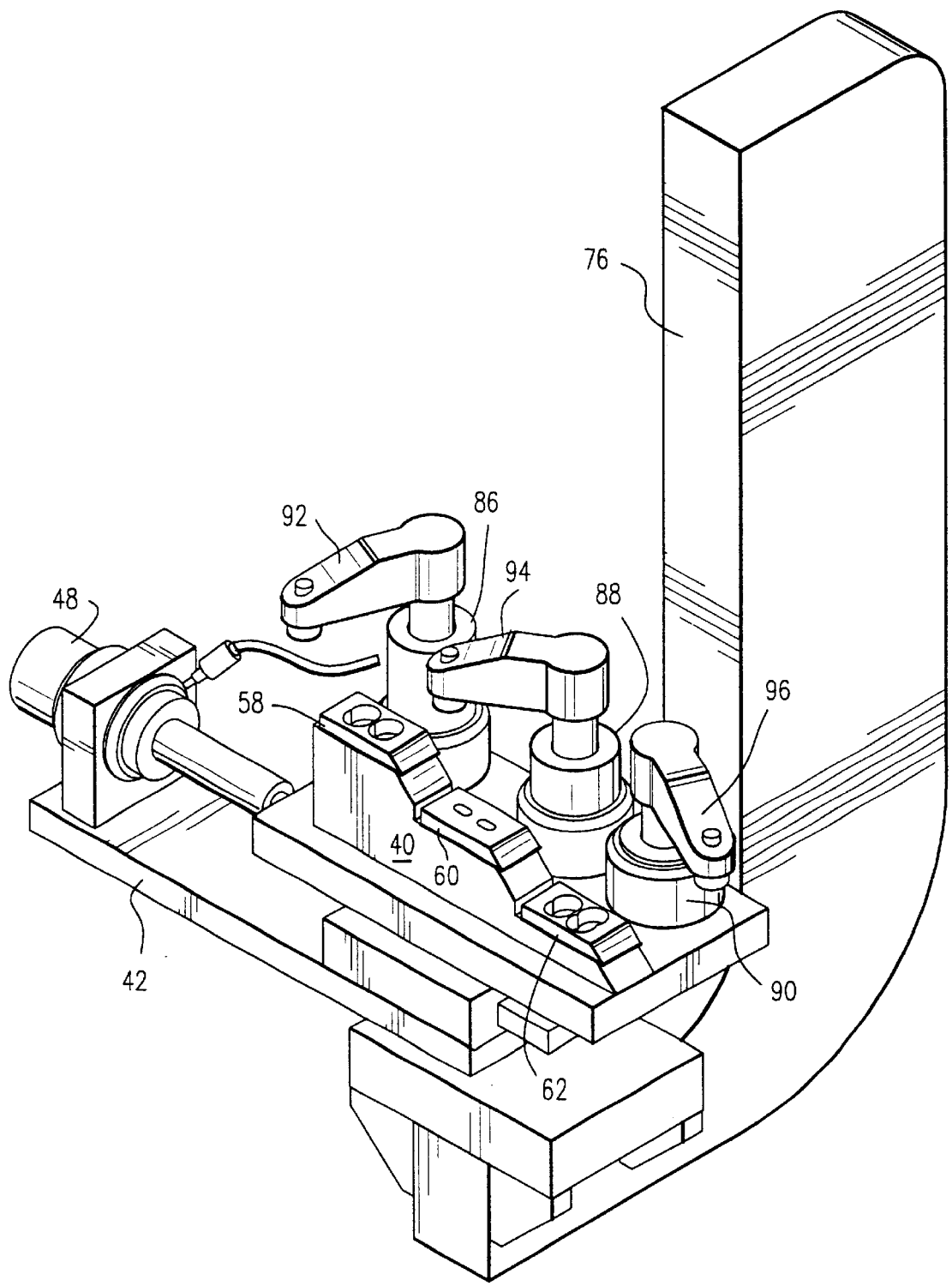
FIG. 4 is a perspective view of the fixture of FIG. 3.
Figure 5:
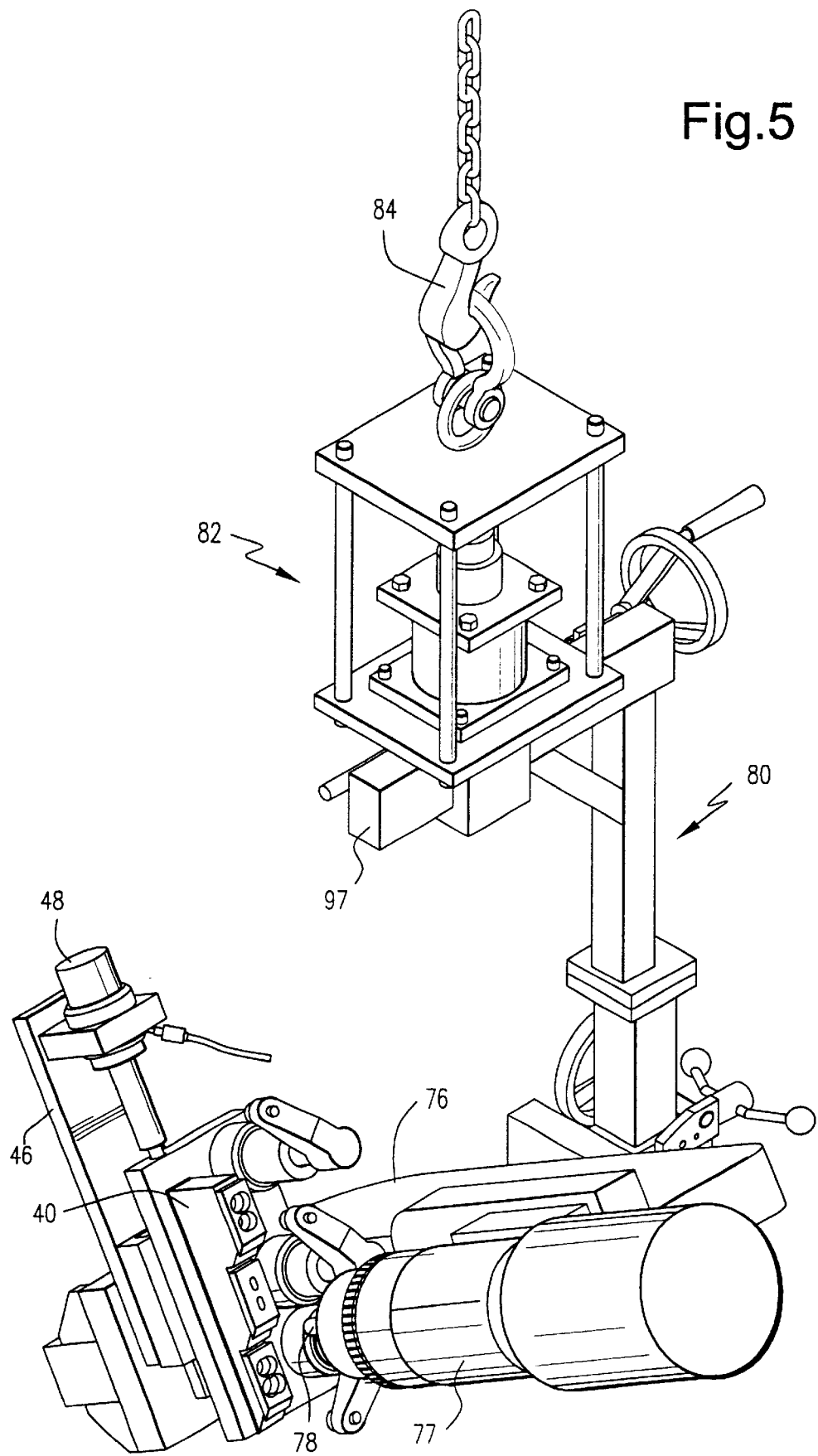
FIG. 5 is a perspective view of an automated peening apparatus according to a preferred embodiment of the present invention.

Referring now to FIG. 4, the fixture 40 also includes a plurality of clamps, e.g., three clamps 86, 88 and 90 having clamp heads 92, 94 and 96, respectively. The clamp heads are linearly extendable and rotatable. Clamp heads 86, 88 and 90 are therefore movable between open positions where the clamp heads are displaced from the sides of the bucket tips and closed positions engaging the sides of the bucket tips, clamping the bucket tips against the respective insert plates. The clamps may be of the type supplied by SPX of Owtaonma, Minn. under the trade name Swing Pull Clamp. Also mounted on the fixture 40 are three rollers 81, 83 and 85 (FIG. 3). The central roller 83 and roller 85 are movable in a lateral direction relative to fixture 40 to accommodate different radii of different bucket wheels. The end roller 81 is fixed to the fixture 40. The rollers serve as guides for the operator during operation of the machine.

Figure 8:
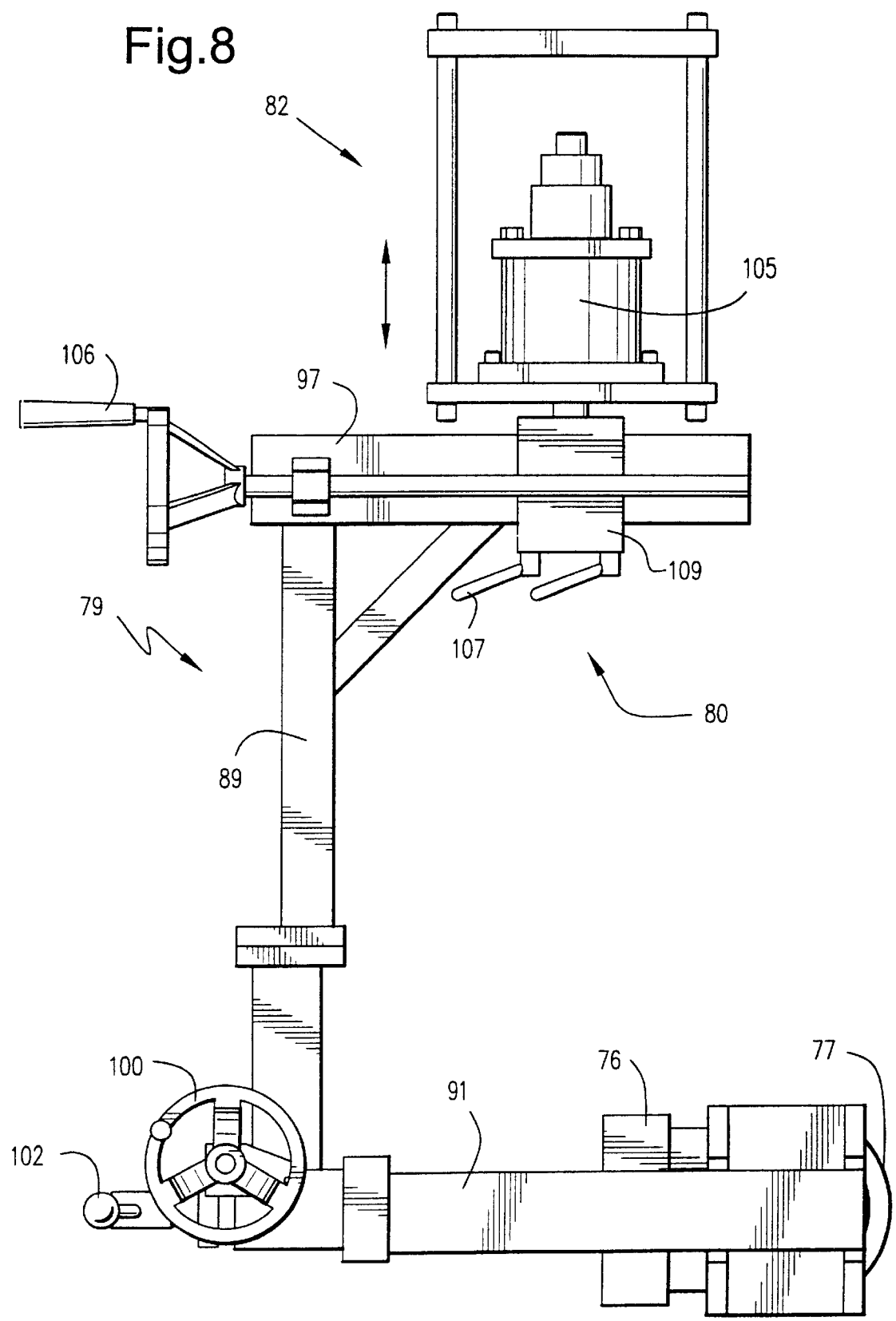
FIG. 8 is an elevational view of the apparatus of FIG. 5.
Figure 9:
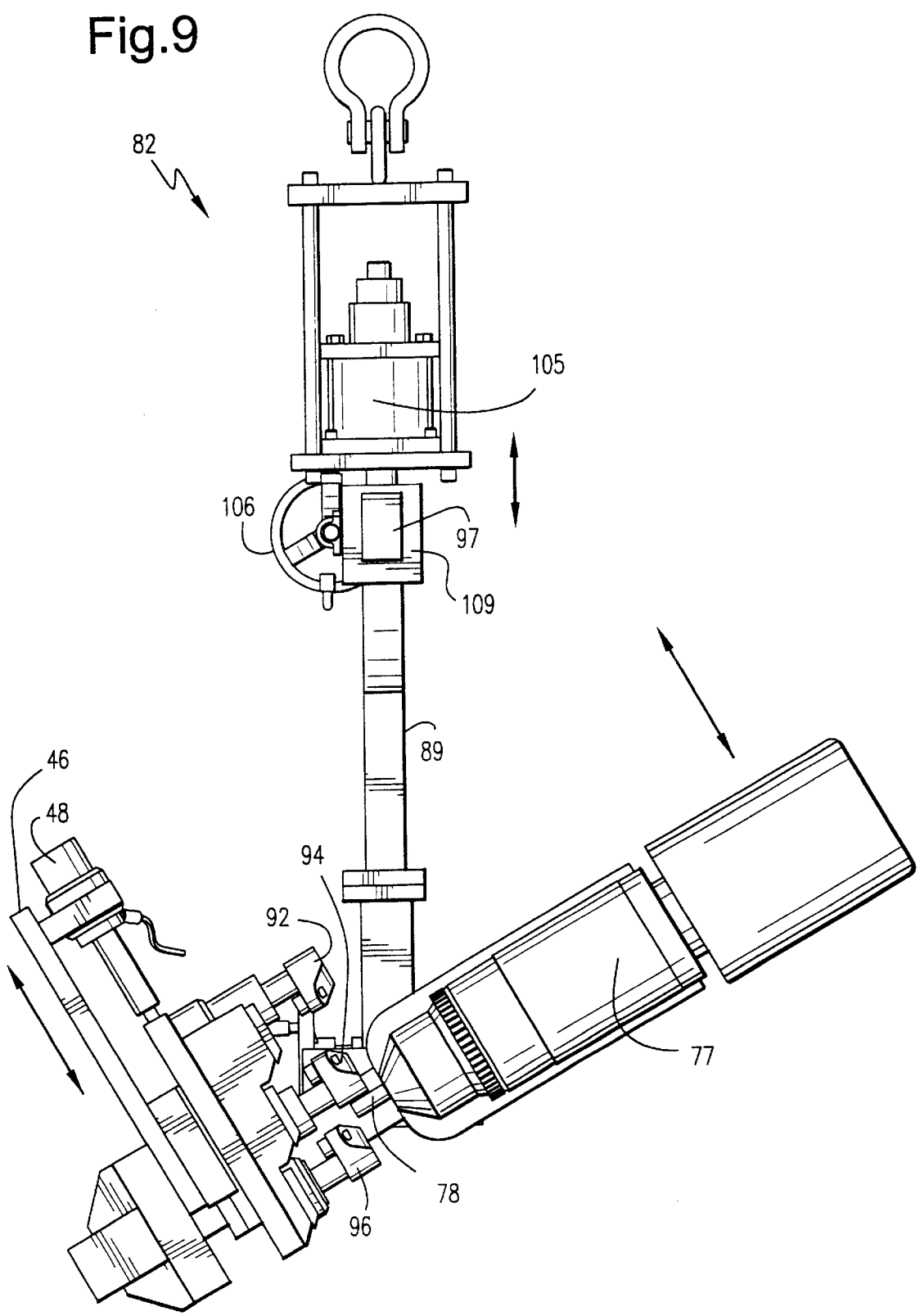
FIG. 9 is a side elevational view of the apparatus of FIG. 5 illustrating various motions of the apparatus.

The C-frame 76 is releasably rotatably carried on a shaft 91 (FIG. 8) which forms the lower leg of the second supporting C-frame, generally designated 79, including a vertically extending elongated support leg 89 and a generally horizontally extending upper leg 97. The peening head 77, together with the fixture 40 are both mounted on the first C-frame 76 and are rotatable about the axis of shaft 91. Particularly, a worm gear drive is mounted at the end of shaft 91 whereby the shaft 91 is rotatable by rotation of the hand wheel 100 through approximately 330°. A pair of locking handles 102 are operable to lock the shaft 91 in a selected rotational orientation. The rotational orientation of the peening head 77 and fixture 40 are determined as a function of the angle of the bucket tips which varies from wheel to wheel. Accordingly, the peening head 77 and fixture 40 must rotate relative to the second C-frame 79 through about 330° to accommodate the angular orientation of the buckets. It will be appreciated that the plane of the wheel containing the buckets is preferably vertical and that the elongated support leg 89 is preferably perpendicular to the floor, notwithstanding the free-floating suspension of the apparatus from the hook 84.

The leg 97 of the second C-frame 79 is linearly adjustable relative to the actuator 82 by operation of a handle 106, e.g., via a screw thread arrangement. The leg 97 and actuator 82 are locked in adjusted positions by tightening locking handles 107 to lock a mounting block 109 carried by the piston of actuator cylinder 105 and leg 97 to one another. The purpose of adjusting the support leg 97 relative to the actuator 82 is to counterbalance the suspended system when using fixtures of different weights in accordance with the type of bucket wheels being fabricated. With the system freely suspended from hook 84, it will be appreciated that any fixture of a greater or lesser weight will alter the angle of suspension. By rotating handle 106 and linearly displacing the support 97 along the actuator 82, the angle of suspension of the apparatus can remain substantially constant, maintaining support leg 89 substantially vertical during peening operations. The actuator 82 includes a fluid, preferably, air, cylinder 105 having a piston, not shown, coupled to the second C-frame 79. A pair of guide rods, also not shown, and slidably engaging between cylinder 105 and block 109, precludes an twist between the actuator 80 ad the second C-frame mounting block 109. The cylinder 105 operates to displace the suspended assembly 80 including the first and second C-frames 76 and 79 and head 77 between two vertically spaced positions for reasons set forth below.

It will also be appreciated that, during fabrication, the turbine wheel is fixed while the peening tool 78 peens the pair of solid tenons 26 of each cover plate. To register the peening tool 78 with the second tenon of the selected cover plate after the first tenon has been peened, the peening tool 77 mounted on the C-frame 76 is displaced relative to the fixture 40 clamped to the turbine wheel. Thus, the C-frame 76 and peening head 77 move in space relative to the fixture 40 and the selected cover plate and bucket tips which are fixed in space and are being secured to one another by the peening operation. It is therefore necessary to compensate for the movement of the peening head relative to the bucket cover. This is accomplished by indexing the actuator 82 between one of two positions, either lowering or raising the assembly. Cylinder 105 is operably coupled to a pressure switch, not shown, on cylinder 48 such that the air cylinder 105 and hydraulic cylinder 48 operate concurrently.

In operation, the appropriate fixture 40 is first selected. This is a function of whether the bucket wheel rotates clockwise or counterclockwise, as well as the configuration and orientation of the buckets on the bucket wheel. Also, the appropriate peening tool is selected. With the selected fixture and peening tool in place, the C-frame 76 is rotated by operation of handle 100 to match the bucket row angles with the fixture surfaces, particularly the surfaces 64, 66 and 68 of the inserts 58, 60 and 62, respectively. The handle 100 is locked by rotating the lock handles 102, hence locking the C-frame 76 in the selected adjusted angular position relative to the buckets. The center roller 83 and end roller 85 are also loosened. The suspended apparatus is then shifted manually to align the locator recesses 70 and 72 of the locator insert plate 60 with the unflared tenons 28 of a selected cover plate. Upon alignment, the clamps 86, 88 and 90 are activated to clamp the preassembled bucket tips and cover plates therebetween against the surfaces 64, 66 and 68. It will be appreciated that three cover plates and four bucket tips are clamped against surfaces 64, 66 and 68, with the middle cover plate serving as the selected cover plate whose solid tenons 26 are to be peened to an overlying bucket tip. The center roller 83 and end roller 85 are then moved to the outside diameter of the bucket row and fixed in place. This facilitates alignment of the fixture relative to the next cover plate as the tenons are peened one after the other, preferably in sequence, about the entire peripheral surface of the bucket wheel.

With the peripheries of the bucket tips and cover plates clamped to fixture 40, the peening head is actuated to peen the first solid tenon 26 aligned between the peening tool 78 and the surface 66. The fluid circuit for the clamps 86, 88 and 90 is interlocked with the fluid circuit for operating the tool head 77 such that the tool head 77 will not operate unless the clamps are actuated to clamp the bucket wheel periphery against the fixture. The peening operation is performed, preferably by a peening head, which performs a radial motion. A preferred tool for use in the present machine may be any one of the RNE series radial forming tools manufactured by the Bracker Corporation, Canonsburg, Pa., and preferably the tool identified as RNE 381. In peening tools of this type, the radial motion of the tool head displaces material uniformly at a constant speed in a multi-sided rosette pattern to ensure uniform and consistent material displacement resulting in higher joint strength and superior surface finish.

Upon completion of the peening of the first tenon, the hydraulic cylinder 48 is actuated. Simultaneously, the air cylinder 105 is actuated under control of interconnected pressure switches, not shown. By actuating the hydraulic cylinder 48, the fixture and clamped bucket wheel periphery remain fixed in space as the C-frame 76 is displaced by operation of cylinder 48 to locate the peening tool 78 in alignment with the second tenon 26 of the pair of tenons of the selected cover plate. Simultaneously, the entire apparatus is displaced by the actuator 82 to compensate for that movement. For example, as cylinder 48 raises the head 77 and second C-frame 89, slack in the hook/chain 84 is taken up by displacing cylinder 105 a substantially corresponding distance. With the peening head aligned with the second tenon, the peening operation is commenced once again. When the second tenon has been peened, the clamps are released and the hydraulic and actuator cylinders are actuated to return to their initial positions. The bucket wheel is then indexed to locate the next cover plate in alignment with the central locator surface 66 of the fixture plate. The apparatus is then displaced to engage the unflared tenons 28 in the locator recesses 70 and 72 of the locator insert plate 60. After clamping the bucket wheel periphery to the fixture similarly as previously described, the peening operation is repeated until all of the solid tenons 26 have been peened.

When all of the solid tenons about the entire periphery of the bucket wheel have been peened, the peening apparatus is removed from the bucket wheel. The unflared tenons are then flared in a conventional manner in a separate operation to complete the securement of the cover plates to the tips of the adjacent buckets.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for securing a cover plate and tips of adjacent buckets of a turbine wheel to one another wherein the cover plate has a tenon projecting from each of the opposite sides thereof and through an opening formed in the respective tips of adjacent first and second buckets, comprising:

a fixture having a plurality of discrete surfaces for registration with side faces of the bucket tips;

at least one of the surfaces having a recess for receiving an end portion of a tenon projecting from one side of a cover plate and through an opening in the tip of the first bucket for locating the cover plate and first bucket tip relative to the fixture; and a peening head having a tool spaced from said one fixture surface for peening an end of a tenon projecting from an opposite side of the cover plate and through an opening in the tip of a second bucket adjacent to and lying on said opposite side of the cover plate from the first bucket tip.

2. Apparatus according to claim 1 wherein said discrete surfaces are generally parallel to and spaced from one another.

3. Apparatus according to claim 1 wherein at least another of the surfaces includes another recess for receiving an end portion of a tenon projecting from one side of another cover plate and through the opening in the tip of the second bucket, said another recess being enlarged relative to the first-mentioned recess.

4. Apparatus according to claim 1 including a clamp having a clamping head for releasably clamping the first and second buckets with the cover plate therebetween against said one surface.

5. Apparatus according to claim 4 wherein said clamp head is movable between positions engaged with and spaced from the second bucket.

6. Apparatus according to claim 5 wherein said clamp is carried by said fixture and movable in linear and rotatable directions between said positions.

7. Apparatus according to claim 1 wherein said surfaces are generally parallel and stepped relative to one another, second and third surfaces thereof lying on opposite sides of said one surface, said second and third surfaces including second and third recesses, respectively, for receiving end portions of tenons projecting from one side of second and third cover plates, respectively, and through respective openings in the tips of the second bucket and a third bucket on opposite sides of the one bucket, and clamps carried by said fixture for releasably clamping the buckets and cover plates against the surfaces.

8. Apparatus according to claim 7 wherein each of said first, second and third surfaces includes another recess.

9. Apparatus according to claim 1 including a base for mounting said fixture, said fixture and said base being mounted for movement relative to one another and means for moving said fixture and said base relative to one another.

10. Apparatus according to claim 9 including a support for freely suspending said fixture, a support assembly suspended from said support for carrying said fixture and said peening head including an actuator for raising and lowering said base and said peening head relative to said fixture.

11. Apparatus according to claim 1 wherein said one surface has a second recess for receiving an end portion of another tenon projecting from the one side of the cover plate and through another opening in the first bucket tip.

12. Apparatus according to claim 11 including means for indexing one of said fixture and said peening head relative to another of said fixture and said peening head for aligning the tool relative to a second tenon projecting from the opposite side of the cover plate and through a second opening in the tip of the second bucket enabling the tool to peen an end of the second tenon to secure the cover plate and the second bucket to one another.

13. Apparatus for securing a cover plate and tips of adjacent buckets of a turbine wheel to one another wherein the cover plate has a tenon projecting from each of the opposite sides thereof and through an opening formed in the respective tips of adjacent first and second buckets, comprising:

a fixture having a plurality of discrete, generally parallel, surfaces offset from one another for registration with side faces of the adjacent first and second bucket tips and locating the cover plate and the first and second bucket tips relative to the fixture;

a peening head having a tool spaced from said fixture for peening an end of a tenon projecting from an opposite side of the over plate and through an opening in the tip of a second bucket adjacent to and lying on said opposite side of the cover plate from the first bucket tip.

14. Apparatus according to claim 13 including a clamp having a clamping head for releasably clamping the first and second buckets with the cover plate therebetween against said one surface.

15. Apparatus according to claim 14 wherein said clamp head is movable between positions engaged with and spaced from the second bucket.

16. Apparatus according to claim 15 wherein said clamp is carried by said fixture and movable in linear and rotatable directions between said positions.

17. Apparatus according to claim 13 including a base for mounting said fixture, said fixture and said base being mounted for movement relative to one another and means for moving said fixture and said base relative to one another.

18. Apparatus according to claim 17 including a support for freely suspending said fixture, a support assembly suspended from said support for carrying said fixture and said peening head including an actuator for raising and lowering said base and said peening head relative to said fixture.

19. Apparatus according to claim 18 including means for indexing one of said fixture and said peening head relative to another of said fixture and said peening head for aligning the tool relative to a second tenon projecting from the opposite side of the cover plate and through a second opening in the tip of the second bucket enabling the tool to peen an end of the second tenon to secure the cover plate and the second bucket to one another.

* * * * *